US012681826B2

(12) United States Patent
West

(10) Patent No.: US 12,681,826 B2
(45) Date of Patent: Jul. 14, 2026

(54) ENVIRONMENTAL STATE DETECTION CONTROL USING A BIFURCATED PROCESSING SYSTEM

(71) Applicant: Jon-Luke West, Manchester, NH (US)

(72) Inventor: Jon-Luke West, Manchester, NH (US)

( * ) Notice: Subject to any disclaimer, the term of this patent is extended or adjusted under 35 U.S.C. 154(b) by 38 days.

(21) Appl. No.: 18/806,300

(22) Filed: Aug. 15, 2024

(65) Prior Publication Data

US 2025/0061033 A1 Feb. 20, 2025

Related U.S. Application Data

(60) Provisional application No. 63/519,590, filed on Aug. 15, 2023.

(51) Int. Cl.
*G06F 11/30* (2006.01)
(52) U.S. Cl.
CPC ...... *G06F 11/3058* (2013.01); *G06F 11/3006* (2013.01)
(58) Field of Classification Search
None
See application file for complete search history.

(56) References Cited

U.S. PATENT DOCUMENTS

| | | | | |
|---|---|---|---|---|
| 9,642,529 B1 * | 5/2017 | Siddiqui | ............ | A61B 5/14552 |
| 2021/0334390 A1 * | 10/2021 | Offor | .................... | G06F 21/606 |
| 2023/0039867 A1 * | 2/2023 | Li | ............................. | G06N 3/04 |
| 2024/0073508 A1 * | 2/2024 | Yoon | ...................... | H04N 23/90 |

* cited by examiner

*Primary Examiner* — Scott C Sun
(74) *Attorney, Agent, or Firm* — Lando & Anastasi, LLP

(57) ABSTRACT

A system is described. The system includes (a) one or more sensor devices; (b) a first microprocessor communicatively coupled to the one or more sensor devices and configured to generate environmental state information based on sensor input received from the one or more sensor devices; (c) a second microprocessor configured to couple communicatively to a remote device via a network connection; and (d) an output line from the first microprocessor to the second microprocessor, the first microprocessor being configured to output the environmental state information to the second microprocessor over the output line without the second microprocessor receiving any of the sensor input. A corresponding apparatus, method, and computer program product are also described.

20 Claims, 4 Drawing Sheets

Fig. 3

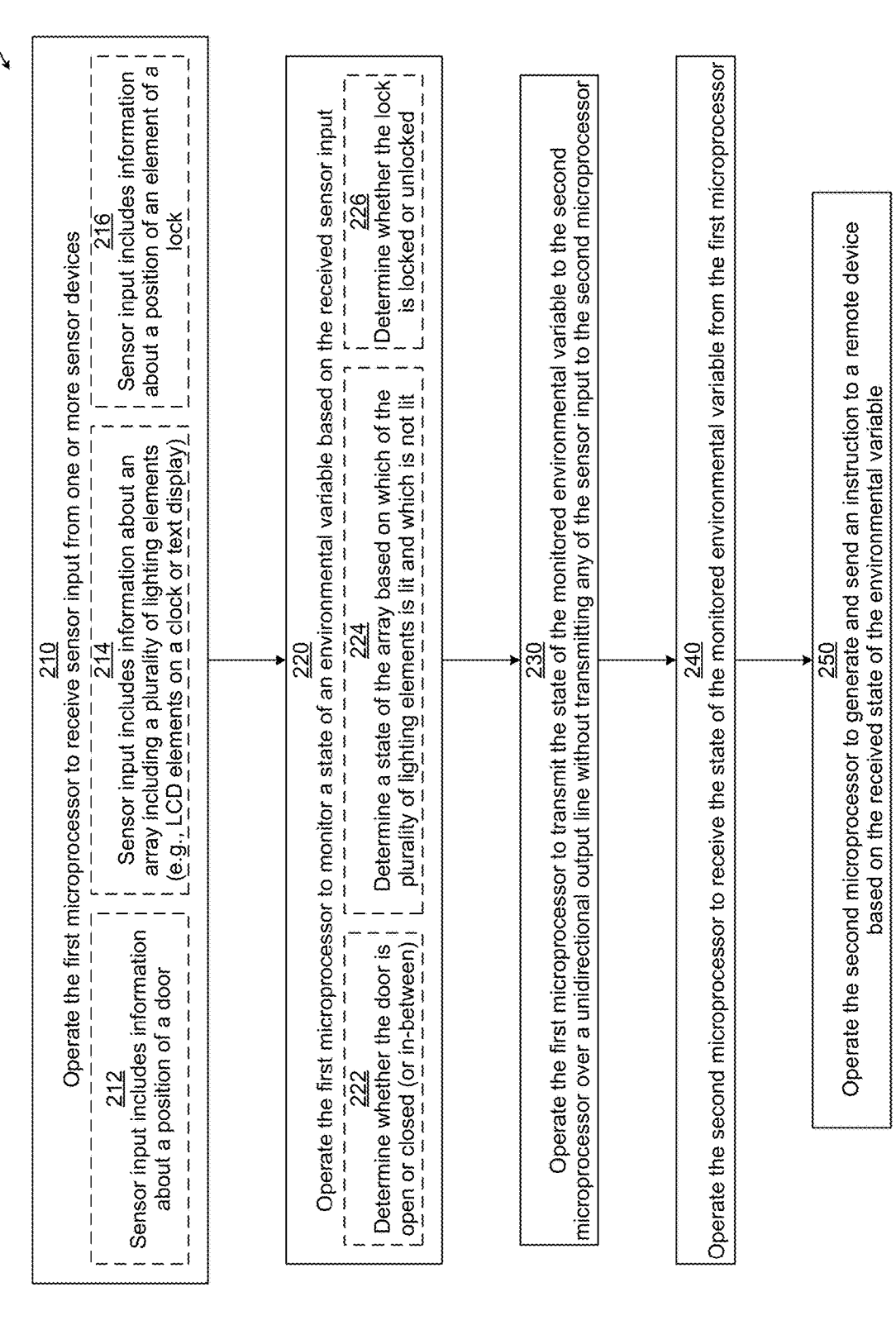

200

210
Operate the first microprocessor to receive sensor input from one or more sensor devices 212
Sensor input includes information about a position of a door 214
Sensor input includes information about an array including a plurality of lighting elements (e.g., LCD elements on a clock or text display)

216
Sensor input includes information about a position of an element of a lock

220
Operate the first microprocessor to monitor a state of an environmental variable based on the received sensor input 222
Determine whether the door is open or closed (or in-between)

224
Determine a state of the array based on which of the plurality of lighting elements is lit and which is not lit 226
Determine whether the lock is locked or unlocked 230
Operate the first microprocessor to transmit the state of the monitored environmental variable to the second microprocessor over a unidirectional output line without transmitting any of the sensor input to the second microprocessor 240
Operate the second microprocessor to receive the state of the monitored environmental variable from the first microprocessor 250
Operate the second microprocessor to generate and send an instruction to a remote device based on the received state of the environmental variable

400

437

438

439(a)
439(b) . . .
439(c)

441

439(g)
439(f)
439(e)
439(d)

436
Sensor Device
pointed at LCD
array (e.g., clock)

300

339(a)

338

337

339(b)

336
Sensor Device
pointed at door

500

539(a)

538

537

539(b)

541

536
Sensor Device
pointed at lock

ENVIRONMENTAL STATE DETECTION CONTROL USING A BIFURCATED PROCESSING SYSTEM

RELATED APPLICATION

This Application claims the benefit under 35 U.S.C. § 111(e) of the Provisional U.S. Patent Application having Ser. No. 63/519,590 filed on Aug. 15, 2023, the entire contents and teachings of which are hereby incorporated herein by this reference.

BACKGROUND

Human presence detection is a highly desired function with many use cases such as security, access control, and system automation. Other types of environmental detection are also useful in certain cases, such as presence detection of entities other than humans as well as state detection of complex systems.

Typical solutions for presence and state detection include using infrared and/or radar sensors. Other solutions use a camera in conjunction with an artificial intelligence (AI) vision system to detect humans. These AI vision systems typically save and/or share images across a network.

SUMMARY

In one embodiment, a system is described. The system includes (a) one or more sensor devices; (b) a first microprocessor communicatively coupled to the one or more sensor devices and configured to generate environmental state information based on sensor input received from the one or more sensor devices; (c) a second microprocessor configured to couple communicatively to a remote device via a network connection; and (d) an output line from the first microprocessor to the second microprocessor, the first microprocessor being configured to output the environmental state information to the second microprocessor over the output line without the second microprocessor receiving any of the sensor input. A corresponding apparatus, method, and computer program product are also described.

BRIEF DESCRIPTION OF THE DRAWINGS

The foregoing and other objects, features, and advantages will be apparent from the following description of particular embodiments, as illustrated in the accompanying drawings in which like reference characters refer to the same parts throughout the different views. The drawings are not necessarily to scale, emphasis instead being placed upon illustrating the principles of various embodiments of the invention.

FIG. 3 illustrates an example method in accordance with one or more embodiments.

DETAILED DESCRIPTION

Figure 1:
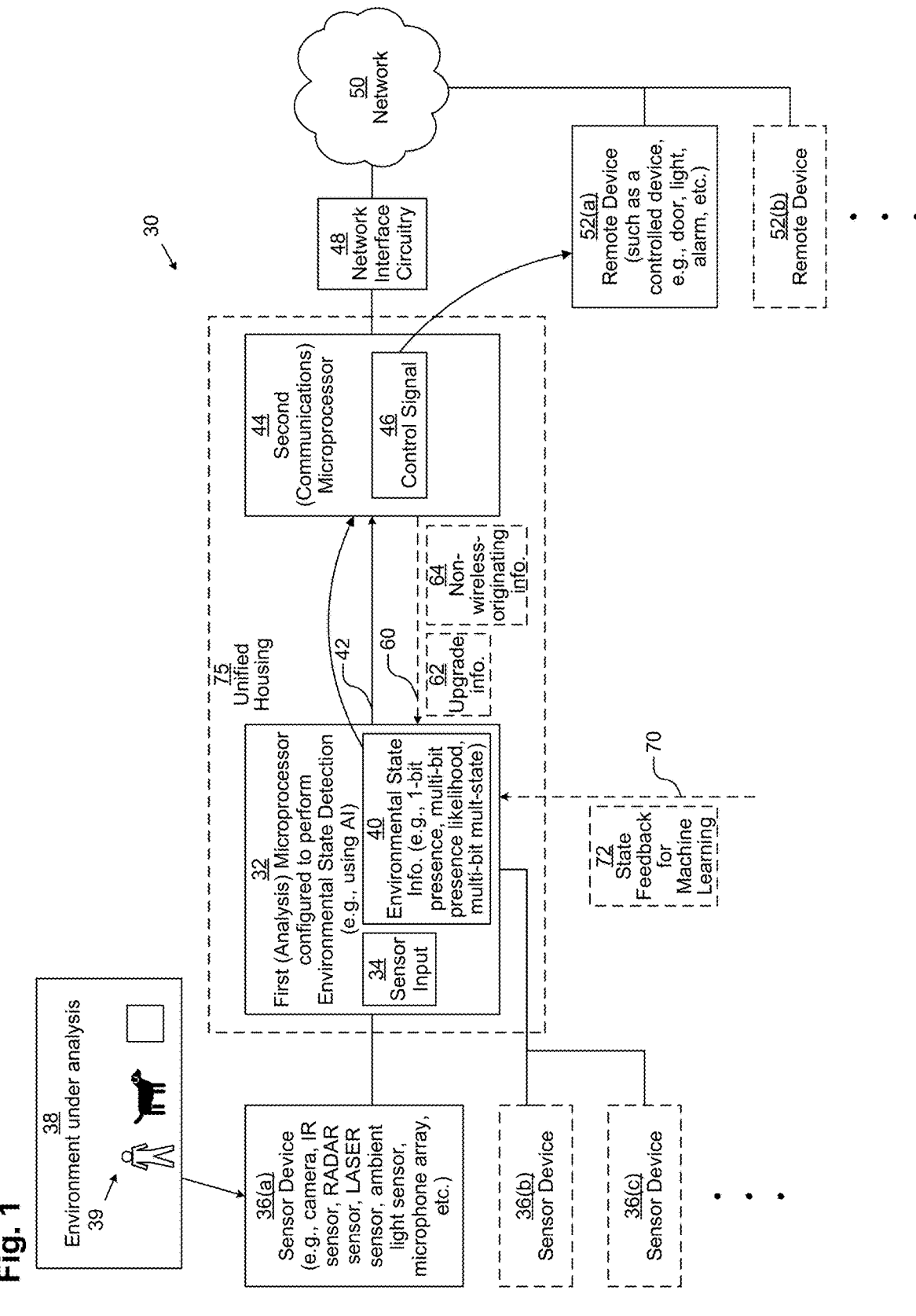
FIG. 1 illustrates an example system, apparatus, computer program products, and associated data structures for use in connection with one or more embodiments.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As described above, typical solutions for presence and state detection can include the use of sensors, cameras, and/or AI vision systems. However, such conventional presence and state detection systems may be deficient for various reasons. For example, systems that utilize infrared and/or radar sensors are prone to false positives as they are unable to reliably determine the difference between a human and another object, and they can be fooled by random motion and changes in ambient lighting. Camera-based AI vision systems are less prone to false positives, but privacy concerns are implicated by the need to save and/or share images over a network. These privacy concerns may pose ethical or even legal problems.

Thus, it would be desirable to create a presence and state detection system that is reasonably accurate but also not subject to privacy problems. This may be accomplished by utilizing a bifurcated processing system. A first microprocessor connects to a camera (or other input devices) and performs environmental state detection. A second microprocessor is partially isolated from the first microprocessor and is configured to receive environmental state information from the first microprocessor without any leakage of camera images or other sensitive information to the second microprocessor. In some embodiments, the first microprocessor may be configured to use a self-contained AI module to perform environmental state detection. Techniques and configurations are provided herein for performing environmental state detection using a bifurcated system.

FIG. 1 depicts an example system 30 for use in connection with various embodiments. System 30 includes a first microprocessor 32, a second microprocessor 44, a set of at least one sensor device 36(a), and a connection 42 from the first microprocessor 32 to the second microprocessor 44. In some embodiments, the set of sensor devices 36 may also include additional sensor devices 36(*b*), 36(*c*), . . . .

A sensor device 36 may be any kind of device configured to perform sensing or measurements on an environment under analysis 38, such as a room or other space. Environment 38 may include one or more items 39 (e.g., a human, animal, inanimate object, etc.) whose presence may be detected therein. In one example embodiment, a sensor device 36 may be a camera configured to record images of the environment 38 (e.g., sequentially, at fixed intervals, or when directed to by an operator or a motion-detection device, etc.). In other example embodiments, one or more of the sensor devices 36 may be an infrared sensor, a millimeter wave radar array, a RADAR sensor, a LASER sensor, an ambient light sensor, a microphone array, etc. Although a camera may be used on its own, typically several of the other types of sensor devices 36 are used in conjunction with each other to combine together to yield enough detail about the environment 38 to allow for proper state or presence detection.

First microprocessor 32 and second microprocessor 44 may each include any kind of processor or set of processors configured to perform operations, such as, for example, a microprocessor, a multi-core microprocessor, a graphics processing unit (GPU), a tensor processing unit (TPU), a field programmable gate array (FPGA), a digital signal processor, a system on a chip (SoC), a specialized collection of electronic circuits, a similar kind of controller, or any combination of the above. In example embodiments, first microprocessor 32 and/or second microprocessor 44 may be an ESP32 family SoC produced by Espressif Systems, a Tegra family SoC installed on a Jetson embedded computing board produced by Nvidia Corp., an EFM32 Gecko family microprocessor produced by Silicon Labs, Inc., or a similar microprocessor.

First microprocessor 32 is configured to perform environmental state detection using sensor input 34 provided by the set of input devices 36 to yield environmental state information 40. In some embodiments, the first microprocessor 32 performs the environmental state detection using an artificial intelligence (AI) model, such as, for example, TensorFlow Lite, or another appropriate type of edge AI framework. In some embodiments, the AI model can be an image (or data) classification model that can be locally deployed to the first microprocessor 32 and used to perform environmental state detection of a specific type of object or pattern. In some embodiments, memory, such as, for example, random access memory (RAM), is connected to the first microprocessor 32 and/or second microprocessor 44. In some embodiments, memory (e.g., cache memory) is embedded within the first microprocessor 32 and/or second microprocessor 44.

In some embodiments, environmental state information 40 is a single bit of information indicating the presence or absence of a particular feature (e.g., a human). In other embodiments, environmental state information 40 may indicate a more complex state, such as, for example, a likelihood of presence of a particular feature. In other embodiments, environmental state information 40 may indicate presence/absence of several features or features that are capable of being in multiple states (e.g., knobs that can be in several different positions; an LED display that displays text or the time using an array of lighting elements, the particular lighting elements that are on/activated indicating the time or text).

The environmental state information 40 is sent to the second microprocessor 44 over communications path 42. In one embodiment, communications path 42 is a single-bit trace that is configured to be either high or low to indicate presence or absence, respectively. In one embodiment, communications path 42 is a multi-bit trace that is configured to indicate one of a discrete number of states of the environmental state information 40. In some embodiments, communications path 42 is a one-way path that can only transmit information from the first microprocessor 32 to the second microprocessor 44, there being no path in the reverse direction.

Second microprocessor 44 is configured to communicate with a set of at least one remote device 52(*a*) over network 50 via network interface circuitry 48. Network 31 may be any kind of communications network or set of communications networks, such as, for example, a LAN, WAN, SAN, the Internet, a wireless communication network, a virtual network, a fabric of interconnected switches, etc. Network interface circuitry 48 may include one or more Ethernet cards, cellular modems, Fibre Channel (FC) adapters, Infini-Band adapters, wireless networking adapters (e.g., Wi-Fi), and/or other devices for connecting to network 50. In an example embodiment, network interface circuitry 48 and network 50 implement the Z-Wave wireless communication protocol allowing device-to-device radio control of smart devices. In an example embodiment, network interface circuitry 48 and network 50 implement the Zigbee wireless communication protocol allowing device-to-device radio control of smart devices.

In response to receiving the environmental state information 40 via communications path 42, second microprocessor 44 may be configured to generate a control signal 46, which it sends to the at least one remote device 52(*a*). In some embodiments, there may be a set of remote devices 32 (depicted as remote devices 52(*a*), 52(*b*), . . . ). In some embodiments, remote devices 52 may be controlled devices configured to be controlled in response to the control signal 46. Example remote devices 52 may include an automated door, a light, an alarm, etc. It should be understood that the control signal 46 need not be an explicit instruction—in some embodiments, control signal 46 may merely indicate that a particular state change has occurred, and the remote device 52 may take independent action in response to that information.

In an example embodiment, in response to the environmental state information 40 indicating the presence of a human in the environment 38 (e.g., the space in front of a door), second microprocessor 44 is configured to generate a control signal 46 indicating that the door of remote device 52(*a*) should open. In response to the environmental state information 40 indicating the absence of a human in the environment, second microprocessor 44 is configured to generate a control signal 46 indicating that the door of remote device 52(*a*) should close.

In another example embodiment, in response to the environmental state information 40 indicating the presence of a dog in the environment 38 (e.g., the space near a dogfood dispenser), second microprocessor 44 is configured to generate a control signal 46 indicating that the dogfood dispenser of remote device 52(*a*) should dispense food.

In another example embodiment, in response to the environmental state information 40 indicating the presence of a human in the environment 38 (e.g., a secure area in the middle of the night), second microprocessor 44 is configured to generate a control signal 46 indicating that an alarm of remote device 52(*a*) should be activated, informing the police or a security service of a possible intruder.

In some embodiments, there may also be a limited communications pathway 60 from the second microprocessor 44 back to the first microprocessor 32. In one embodiment, limited communications pathway 60 is configured to only transmit upgrade information 62 from the second microprocessor 44 back to the first microprocessor 32. Upgrade information 62 may include data allowing the first microprocessor 32 to upgrade its firmware or software to allow it function better. In another embodiment, limited communications pathway 60 is configured to only transmit secure data 64 received by the second microprocessor 44 via a wired connection to the exclusion of a wireless network connection to reduce the likelihood of hacking of the first microprocessor 32.

In some embodiments, a communications pathway 70 may be configured to input into the first microprocessor 32 to allow state feedback 72 to be sent to the first microprocessor 32. This state feedback 72 may be used to allow the first microprocessor 32 to update its AI model using machine learning.

In some embodiments, the first microprocessor 32 and the second microprocessor 44 are both contained within a single unified housing 75. For example, the unified housing 75 may be a single detection device having a motherboard that attaches to both the first microprocessor 32 and the second microprocessor 44, connecting them via a single-bit or multi-bit communications pathway 42 traced onto the motherboard.

In other embodiments, the first microprocessor 32 and the second microprocessor 44 may be housed separately from each other, a serial cable serving as the single-bit or multi-bit communications pathway 42.

The memory associated with each microprocessor 32, 44 may store various computer programs and data structures. In some embodiments, the memory may also include a persistent storage portion. Persistent storage portion of memory may be made up of one or more persistent storage devices, such as, for example, magnetic disks, flash drives, solid-state storage drives, or other types of storage drives. Persistent storage portion of memory is configured to store program code and data even while the microprocessors 32, 44 are powered off. The various computer programs and data structures are typically stored in this persistent storage portion of memory so that they may be loaded into a system portion of memory for execution on microprocessors 32, 44 upon a restart or as needed. The various computer programs, when stored in non-transitory form either in the volatile or persistent portion of memory, each form a computer program product. The microprocessors 32, 44 running one or more of these computer program products thus forms a specialized circuit constructed and arranged to carry out the various processes described herein.

Figure 2:
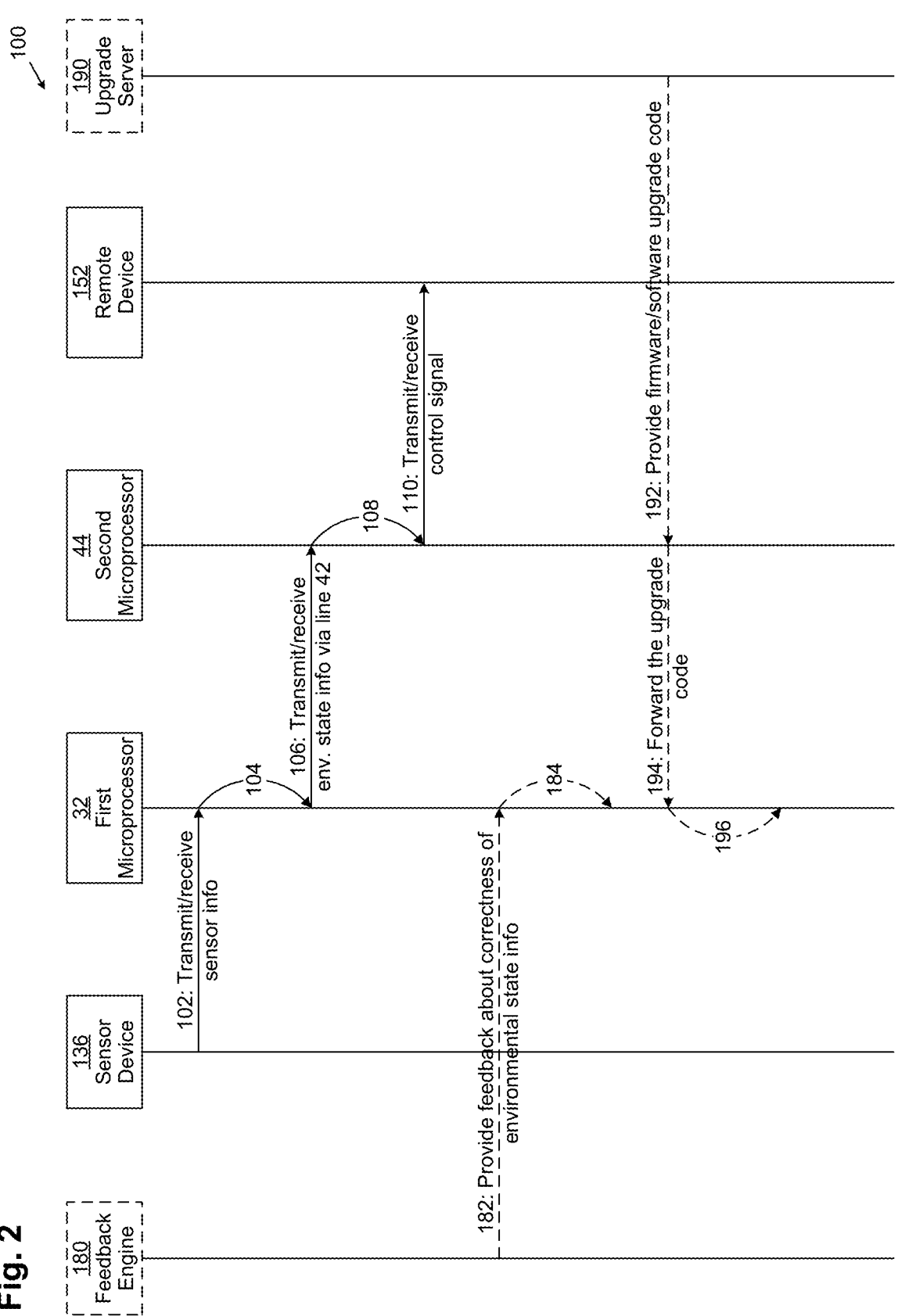
FIG. 2 illustrates an example method in accordance with one or more embodiments.

FIG. 2 illustrates an example method 100 performed by various elements of the system 30 and attached devices. It should be understood that any time a piece of software is described as performing a method, process, step, or function, what is meant is that a computing device on which that piece of software is running performs the method, process, step, or function when executing that piece of software on its processing circuitry. It should be understood that one or more of the steps or sub-steps of method 100 may be omitted in some embodiments. Similarly, in some embodiments, one or more steps or sub-steps may be combined together or performed in a different order. Dashed lines indicate that a device or step is either optional or representative of alternate embodiments or use cases.

In step 102, a sensor device 136 (e.g., one of the sensor devices 36) transmits sensor information 34 to the first microprocessor 32 about the environment 38. Upon receipt, the first microprocessor 32 performs an environmental state detection operation 104 to generate environmental state information 40. In step 106, the first microprocessor 32 transmits the generated environmental state information 40 to the second microprocessor 44 via communications path 42. Then, in step 108, the second microprocessor 44 performs step 108 to generate control signal 46, which it transmits to a remote device 152 (e.g., one of the remote devices 52) to effect control of that device 152.

In some embodiments, in step 182, a feedback engine 180 provides feedback 72 about the correctness of the environmental state information 40 to the first microprocessor 32, so that the first microprocessor 32 can perform a retraining operation 184 so that it can update its AI model for improved performance in the future. Feedback engine 180 may include, for example, a computing device configured to receive human-generated reports of the environmental state of the environment 38 and to include that information as the feedback 72.

In some embodiments, in step 192, an upgrade server 190 provides firmware or software upgrade code to the second microprocessor 44 so that the second microprocessor 44 can forward that upgrade code to the first microprocessor 32 (step 194). In response, the first microprocessor 32 may upgrade itself (step 196) using the upgrade code.

FIG. 3 illustrates an example method 200 performed by various elements of the system 30 and attached devices for monitoring a state 40 of one (or more) environmental variable that can have at least two different states, In step 210, first microprocessor 32 operates to receive sensor input 34 from one or more sensor devices 36. In some embodiments, step 210 may include optional sub-step 212, 214, or 216.

Figure 4:
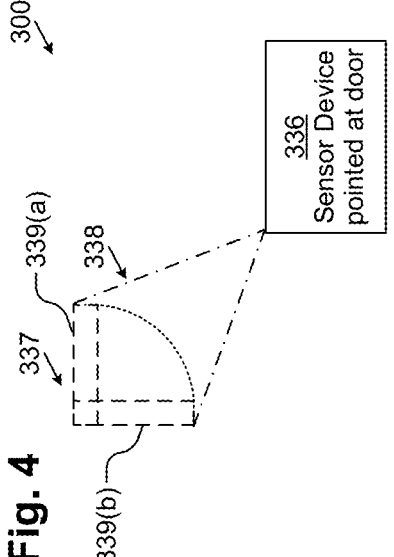

Sub-step 212 may be illustrated in conjunction with the system 300 of FIG. 4. FIG. 4 depicts an example sensor device 336 that is pointed at a door 337, which can be in a closed position 339(*a*) or an open position 339(*b*) (or an intermediate position, not shown). Thus, in sub-step 212, the sensor input 34 includes information about a position 339 of a door 337. The environment under analysis 39 includes region 338 between the sensor device 336 and the extreme positions 339(*a*), 339(*b*) of the door 337.

Figure 5:
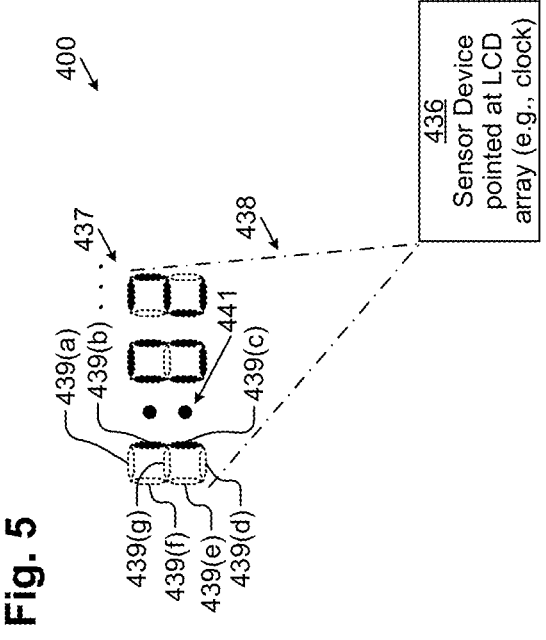
FIGS. 4-6 illustrate alternative example systems in accordance with one or more embodiments.

Sub-step 214 may be illustrated in conjunction with the system 400 of FIG. 5. FIG. 5 depicts an example sensor device 436 that is pointed at an array 437 of light elements 439 (depicted as light elements 439(*a*), 439(*b*), 439(*c*), 439(*d*), 439(*d*), 439(*e*), 439(*f*), 439(*g*), . . . ), which can be on or off. Array 437 may be a text display, a clock, etc. Light elements 439 may be, for example, light emitting diodes (LED) or liquid crystal display (LCD) elements. As depicted light elements 439(*b*), 439(*c*) are on, forming the digit "1" on array 437, which is depicted as a clock. Additional light elements 439 (not separately numbered) are also on, showing a time of "1:02" in conjunction with additional light elements 441 that form a colon (":"). Thus, in sub-step 214, the sensor input 34 includes information about which light elements 439 of light array 437 are illuminated. The environment under analysis 39 includes region 438 between the sensor device 436 and the extreme positions of the light elements 439 of the light array 437. In a related embodiment, a smaller number of simple light elements 439 may be used. For example, an electric stove may have a single LED that is lit as long as any burner remains hot. In another example, an electric stove may have one LED per burner, with each LED being lit as long as the respective burner for that LED remains hot. In these example embodiments, the sensor input 34 includes information about whether each LED is lit or not.

Figure 6:
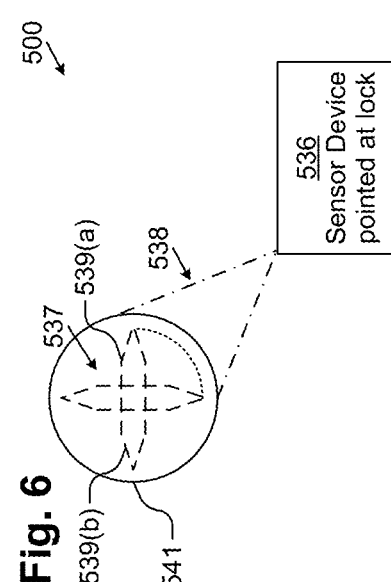

Sub-step 216 may be illustrated in conjunction with the system 500 of FIG. 6. FIG. 6 depicts an example sensor device 536 that is pointed at a lock 541, which includes a lock element 537 (e.g., a knob) that can be in a locked position 539(*a*) or an unlocked position 539(*b*). Thus, in sub-step 216, the sensor input 34 includes information about a position 539 of an element 537 of a lock 541. The environment under analysis 39 includes region 538 between the sensor device 536 and the extreme positions 539(*a*), 539(*b*) of the lock element 537.

In step 220, first microprocessor 32 operates to monitor a state 40 of an environmental variable based on the received sensor input 34. In some embodiments, step 220 may include optional sub-step 222, 224, or 226 (corresponding to sub-steps 212, 214, 216, respectively). In some embodiments, only one environmental variable is monitored to the exclusion of all others.

In sub-step 222, first microprocessor 32 determines whether the door 337 is in the closed state 339(*a*) or the open state 339(*b*). In some embodiments, first microprocessor 32 may alternatively determine that the door is in between the two extreme states 339(*a*), 339(*b*). A classification/identification AI model that is trained to determine the difference between an open and a closed door 337 based on the specific data that is collected may be deployed on the first microprocessor 32. This AI model may be fine-tuned for use in environments where it is deployed to account for variations such as placement, lighting, door style, etc.

In step 224, first microprocessor 32 determines the state 40 of the array 437 based on which of the plurality of light elements 439 is illuminated, and which are not illuminated. For example, as depicted in FIG. 5, the state 40 of the array 437 is 1:02. A classification/identification AI model that is trained to determine the difference between a light element 439 that is on versus off based on the specific data that is collected may be deployed on the first microprocessor 32. This AI model may also be trained to determine a time or to recognize text based on which light elements 537 are on. This AI model may be fine-tuned for use in environments where it is deployed to account for variations such as placement, lighting, light panel style, etc. In the related embodiment disclosed above in connection to sub-step 214, the state 40 of the stove may be determined with reference to which LEDs are illuminated. For example, if two of the four LEDs on the stove are lit, then the state 40 of the stove would be that the two burners that correspond to those LEDs are hot, while the other two burners are not hot.

In sub-step 226, first microprocessor 32 determines whether the lock 541 is in the locked state 539(*a*) or the unlocked state 539(*b*) based on the position of the lock element 537. A classification/identification AI model that is trained to determine the difference between a locked and an unlocked locking mechanism based on the specific data that is collected may be deployed on the first microprocessor 32. This AI model may be fine-tuned for use in environments where it is deployed to account for variations such as placement, lighting, lock style, etc. In step 230, first microprocessor 32 operates to transmit the state 40 of the monitored environmental variable to the second microprocessor 44 over a unidirectional output line (e.g., communications path 42) without transmitting any of the sensor input 34 to the second microprocessor 44. For example, the state 40 is transmitted using a binary signal (1 for yes, 0 for no). As another example, the state 40 is transmitted using a small number of bits to encode a discrete set of states (e.g., 00 for off, 01 for intermediate-low, 10 for intermediate-high, and 11 for MAX).

In step 240, second microprocessor 44 operates to receive the state 40 of the monitored environmental variable from the first microprocessor 32.

Finally, in step 250, second microprocessor 44 operates to generate and send an instruction (e.g., control signal 46) to a remote device 52 based on the received state 40 of the environmental variable. For example, if the state 40 indicates that door 337 is in the open position 339(*b*), then the control signal 46 might be directed at an actuator mechanism (not depicted) coupled to the door 337, directing the actuator mechanism to close the door 337. As another example, if the state 40 indicates that array 437 is displaying text that reads "Error 1," then the control signal 46 might be directed at a messaging system (not depicted), directing the messaging system to call for a technician to fix an appliance (not depicted) that is coupled to the array 437. As another example, if the state 40 indicates that lock 541 is in the locked state 539(*a*), then the control signal 46 might be directed at an actuator mechanism (not depicted) coupled to the lock 541, directing the actuator mechanism to unlock the lock 541.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicants make no admission that such technique, method, apparatus, or other concept is actually prior art under 35 U.S.C. § 102 or 103, such determination being a legal determination that depends upon many factors, not all of which are known to Applicants at this time.

What is claimed is:

1. A system comprising:

one or more sensor devices;

a first microprocessor communicatively coupled to the one or more sensor devices and configured to generate environmental state information based on sensor input received from the one or more sensor devices, the environmental state information representing an observable state of an inanimate object external to the system;

a second microprocessor configured to couple communicatively to a remote device via a network connection; and an output line from the first microprocessor to the second microprocessor, the first microprocessor being configured to output the environmental state information to the second microprocessor over the output line without the second microprocessor receiving any of the sensor input.

2. The system of claim 1 wherein the one or more sensor devices includes a camera.

3. The system of claim 1 wherein the first microprocessor uses an artificial intelligence technique to generate the environmental state information.

4. The system of claim 3 wherein:

the artificial intelligence technique includes a machine learning model (MLM); and the system further comprises an input line into the first microprocessor, the input line not being connected to the first microprocessor, the input line being configured to provide a control signal to the MLM, providing feedback regarding the environmental state information.

5. The system of claim 1 wherein the output line is a single bit pin output (SBPO).

6. The system of claim 1 wherein the output line is a multi-bit pin output (MBPO), the MBPO being configured to indicate one among a discrete plurality of states.

7. The system of claim 1 wherein there is no output from the second microprocessor towards the first microprocessor.

8. The system of claim 1 wherein there is a single output from the second microprocessor towards the first microprocessor, the single output being configured to only provide upgrade information for the first microprocessor.

9. The system of claim 1 wherein there is an output from the second microprocessor towards the first microprocessor, the output being configured to block any communications received via a wireless connection.

10. The system of claim 1 wherein the second microprocessor is configured to issue control commands to the remote device based on the environmental state information.

11. The system of claim 1 wherein the system further includes a common housing, the common housing enclosing both the first and second microprocessors.

12. The system of claim 1 wherein:

the first microprocessor is housed within a first device;

the second microprocessor is housed within a second device; and the output line is a serial line connecting the first device to the second device.

13. A method of performing environmental state detection in a system having a first microprocessor and a second microprocessor, the method comprising:

operating the first microprocessor to:

receive sensor input from one or more sensor devices;

monitor a state of an environmental variable based on the received sensor input, the environmental variable representing an observable state of an inanimate object external to the system; and transmit the state of the monitored environmental variable to the second microprocessor over a unidirectional output line without transmitting any of the sensor input to the second microprocessor; and operating the second microprocessor to:

receive the state of the monitored environmental variable from the first microprocessor; and generate and send an instruction to a remote device based on the received state of the environmental variable.

14. The method of claim 13 wherein:

the received sensor input includes information about a position of a door; and monitoring the state of the environmental variable includes determining whether the door is open or closed.

15. The method of claim 13 wherein:

the received sensor input includes information about an array including a plurality of lighting elements; and monitoring the state of the environmental variable includes determining a state of the array based on which of the plurality of lighting elements is lit and which is not lit.

16. The method of claim 13 wherein:

the received sensor input includes information about a position of an element of a lock; and monitoring the state of the environmental variable includes determining whether the lock is locked or unlocked.

17. The method of claim 13 wherein the first microprocessor operates to monitor the state of the environmental variable to the exclusion of any other environmental variable.

18. The system of claim 1 wherein the output line is configured to indicate one among a discrete plurality of states.

19. The system of claim 18 wherein the discrete plurality of states includes at least three states.

20. The system of claim 1 wherein the inanimate object is one of:

a lock; and a set of lights.

* * * * *